(12) United States Patent
Fabiano et al.

(10) Patent No.: US 6,508,702 B1
(45) Date of Patent: Jan. 21, 2003

(54) DRIVER VENTILATION FOR DELIVERY TRUCK

(75) Inventors: Frank A. Fabiano, Union City, MI (US); Jay C. Kessler, Howe, IN (US); Warren H. Anderson, Sturgis, MI (US); Patrick M. Eagan, Sturgis, MI (US)

(73) Assignee: Grumman Olson Industries, Inc., Sturgis, MI (US)

( * ) Notice: Subject to any disclaimer, the term of this patent is extended or adjusted under 35 U.S.C. 154(b) by 0 days.

(21) Appl. No.: 09/465,106

(22) Filed: Dec. 16, 1999

Related U.S. Application Data

(60) Provisional application No. 60/112,496, filed on Dec. 16, 1998.

(51) Int. Cl.[7] ................................................. B60H 1/28
(52) U.S. Cl. ......................................... 454/138; 454/84
(58) Field of Search .............................. 454/107, 109, 454/111, 112, 137, 138, 143, 152, 158, 82, 306, 84, 87, 144

(56) References Cited

U.S. PATENT DOCUMENTS

| 1,956,123 A | | 4/1934 | Givens |
| 2,065,445 A | * | 12/1936 | Galson ....................... 454/107 |
| 2,089,799 A | * | 8/1937 | Hulse ......................... 454/112 |
| 2,172,939 A | | 9/1939 | Lintern et al. |
| 3,656,423 A | | 4/1972 | Anthony |
| 3,868,896 A | | 3/1975 | Doll et al. |
| 5,779,536 A | | 7/1998 | McCorkel et al. |
| 6,062,975 A | * | 5/2000 | Knudtson .................... 454/138 |
| 6,279,978 B1 | * | 8/2001 | Schreyer et al. ........ 454/137 X |

FOREIGN PATENT DOCUMENTS

| DE | 71 41 863 | 8/1973 |
| DE | 196 43 444 | 11/1997 |
| GB | 709 325 | 5/1954 |
| GB | 2 020 006 | 11/1979 |
| GB | 2 030 084 | 4/1980 |

* cited by examiner

*Primary Examiner*—Marold Joyce
(74) *Attorney, Agent, or Firm*—Baker & Daniels

(57) ABSTRACT

A vehicle with a ventilation system that includes a chassis and vehicle body. The vehicle body is mounted on the chassis, and has a floor, a ceiling, a front section, and a back section. The front section includes control instrumentation and an adjacent driver seat. The front section further defines a vent opening and has a duct mounted on the ceiling. The duct extends from the vent opening, and has at least one air portal structured and arranged to direct air over the driver seat. The duct includes a main passage and projections, which are partially defined by sloping walls so as to provide a region of less constrictive air flow as compared to an intake passage. The intake passage extends upward from the vent opening to inhibit moisture from entering the main passage, and the projections and slope of the intake passage serve as a conduit to drain away any moisture that does manage to enter the main passage.

20 Claims, 4 Drawing Sheets

DRIVER VENTILATION FOR DELIVERY TRUCK

This application claims benefit of provisional Appln. No. 60/112,496 filed Dec. 16, 1998.

BACKGROUND OF THE INVENTION

1. Field of the Invention

The invention relates to that of delivery trucks. More specifically, the field of the invention involves ventilation systems for the passenger section of the delivery vehicle.

2. Discussion of Prior Art

Delivery Trucks have been developed to transport packages and mail over ground, with periodic stops for delivering packages, mail, or other cargo. Such trucks are generally segmented into two distinct sections, a driver section at the front of the vehicle and a cargo section at the rear of the vehicle. These sections are often separated by a wall, typically having a door to allow access from the driver section to the cargo storage within the vehicle. Because of space and cost constraints, delivery trucks typically do not include an air conditioning system. Rather, such trucks depend on fans and ventilation to keep the driver section at a reasonable temperature. These fans and ventilation are disposed on the front control panel of the truck and direct the air over the driver from that forward position.

Ventilation systems on such delivery trucks may also serve a second purpose of pressurizing the cargo section. One conventional arrangement involves installing the vent intake opening on the front of the vehicle over the driver's window. A duct is mounted on the driver section ceiling which conveys air through the driver section and terminates with an exhaust opening facing into the cargo section. By venting in air from the top of the vehicle, relatively particulate-free air is forced into the cargo section when the vehicle is traveling in a forward direction. The resulting higher pressure within the cargo section keeps the particulate-laden air and moisture near the bottom of the vehicle from penetrating into the interior of the cargo section.

Attempts have been made to create greater cooling for the driver section with the ventilation system without diluting the pressurization of the cargo section. Unfortunately, previous attempts have involved gated openings in the cargo vent to direct a portion of the vented air towards the driver's seat. While the gated openings created additional air movement over the driver, they also significantly reduced the pressurization of the cargo section. These attempts have proven to be less than optimal.

SUMMARY OF THE INVENTION

The present invention involves an improved ventilation duct for a delivery truck. The inventive duct system has an intake opening located at the front of the vehicle, with the duct being mounted on the ceiling of the driver section immediately above the driver. The duct has a damper near the front of the vehicle to turn the vent on and off, and gated openings over the driver's seat to direct the airflow. An additional vent may also be installed over the passenger seated position if desired. The duct may also include an air filter system.

The present invention, in one form thereof, involves a delivery truck comprising truck chassis and a vehicle body. The truck chassis has control instrumentation. The vehicle body has a floor, a ceiling, a front section, and a back section, with the front and back sections being partitioned by a wall. The front section includes the control instrumentation and a driver seat located proximate to the control instrumentation. The front section further defines a vent opening. A duct is mounted on the ceiling, with an intake passage of the duct extending upwardly from the vent opening toward the ceiling and a main passage of the duct extending laterally over the driver seat. Coming off the main passage the duct has projection portions partly defined by sloping walls. The duct has at least one air portal opening structured and arranged to direct air over the driver seat. As will be described in the detailed description, this configuration of the duct helps prevent moisture from entering within the vehicle body and causes any moisture accumulating within the duct to drain therefrom to the exterior of the vehicle. The configuration also enhances air flow through the duct and out the air portals as the air moves from a more constrictive passage at the intake portion to a less constrictive air passage of greater volume in the projection portions.

In addition, a passenger seat vent may be included as an option. The vent duct may include an air filter system, and louvers may be disposed in the vent to direct the air flow to a particular location. The duct piece may be economically manufactured out of a composite material using a molding or casting process.

The above mentioned and other features and objects of this invention, and the manner of attaining them, will become more apparent and the invention itself will be better understood by reference to the following description of an embodiment of the invention taken in conjunction with the accompanying drawings.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein.

Figure 1:
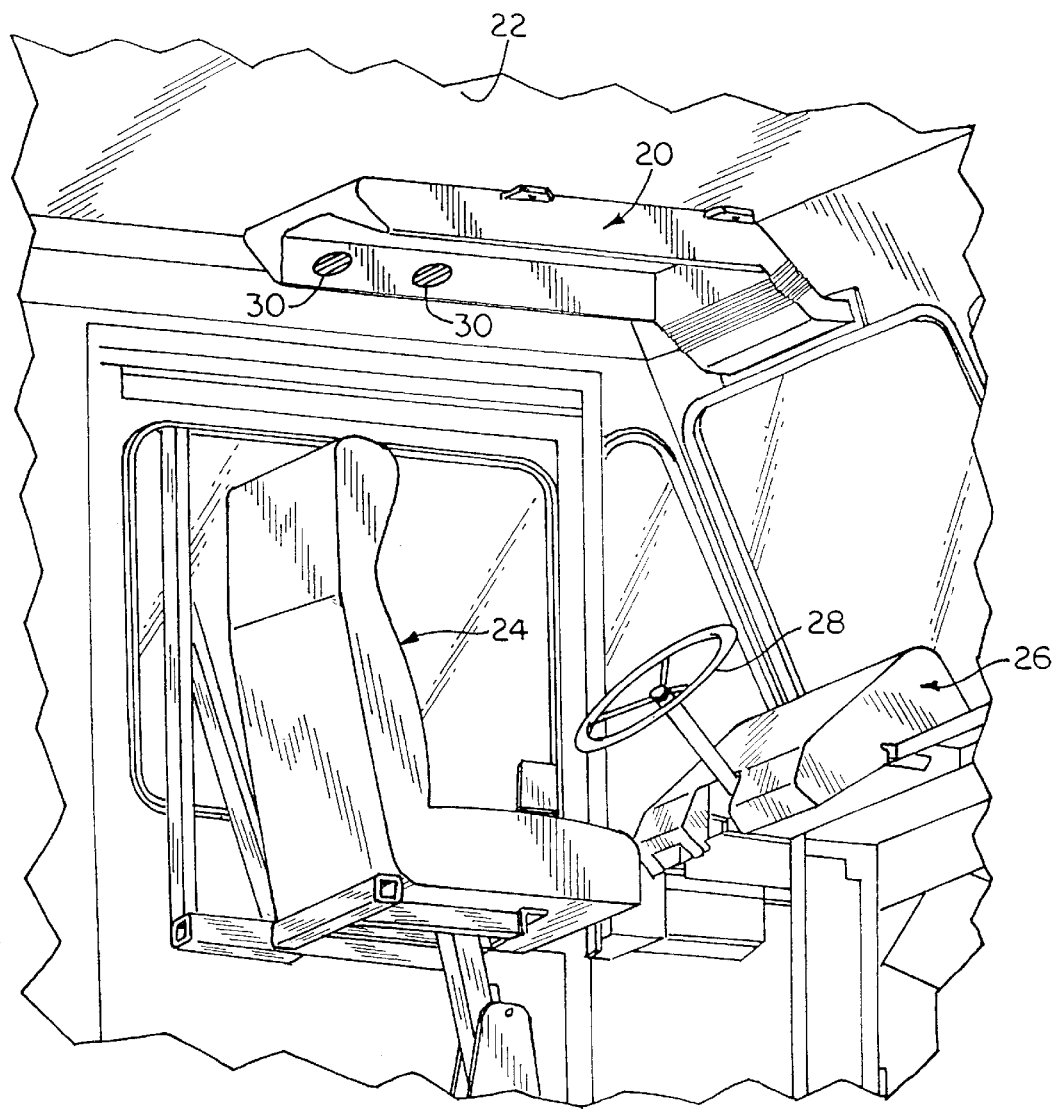
FIG. 1 is a interior perspective view of the driver vent duct installed in the driver section of a delivery vehicle of the present invention.

Corresponding reference characters indicate corresponding parts throughout the several views. Although the drawings represent embodiments of the present invention, the drawings are not necessarily to scale and certain features may be exaggerated in order to better illustrate and explain the present invention. The exemplification set out herein illustrates an embodiment of the invention, in one form, and such exemplifications are not to be construed as limiting the scope of the invention in any manner.

DESCRIPTION OF THE PRESENT INVENTION

The embodiment disclosed below is the preferred embodiment, but is not intended to be exhaustive or limit the invention to the precise form disclosed in the following detailed description. Rather, the embodiment is chosen and described so that others skilled in the art may utilize its teachings.

The invention relates to delivery vehicles such as those disclosed in U.S. Pat. No. 5,178,435, entitled "Drain Assembly for Use on a Vehicle", assigned to the assignee of the present invention, the disclosure of which is incorporated by reference herein. For walk-in or step type vans or trucks, often the driver sections of those vehicles lack any air cooling mechanism, or rely on a floor or control panel vent or cooling fans to provide the driver with cooling air. The driver often opens and closes doors to the outside or the cargo section as a normal course of business, which would tend to dilute the air inside the driver's section with different temperature air. Thus, even providing air conditioning may have only minimal value due to the frequent dilution of the temperature of the driver section air.

Referring to FIG. 1, in accordance with the present invention, a driver air duct 20 is mounted in a vehicle 60 (FIG. 7) on ceiling 22, opposite a floor (not shown) over a driver seat 24. Driver seat 24 is disposed behind a control panel 26 and a steering wheel 28. Air portals 30 are disposed on the lower side of driver air duct 20 and direct air flow out directly onto driver sear 24.

Figure 2:
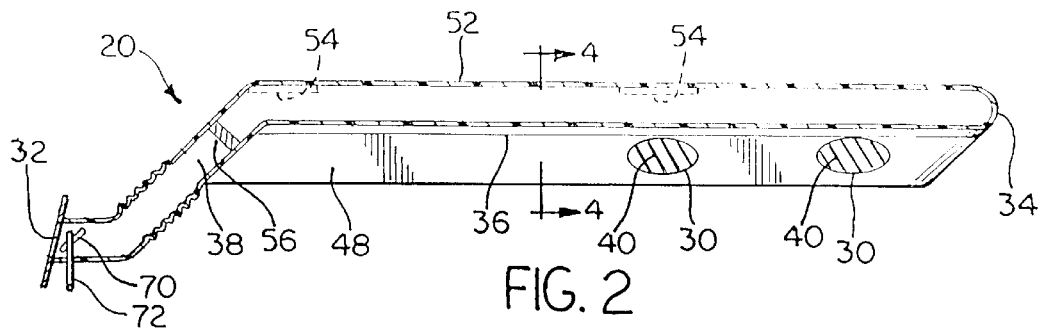
FIG. 2 is a side, sectional view of the driver vent duct and taken a long view lines 2—2 of FIG. 3.
Figure 3:
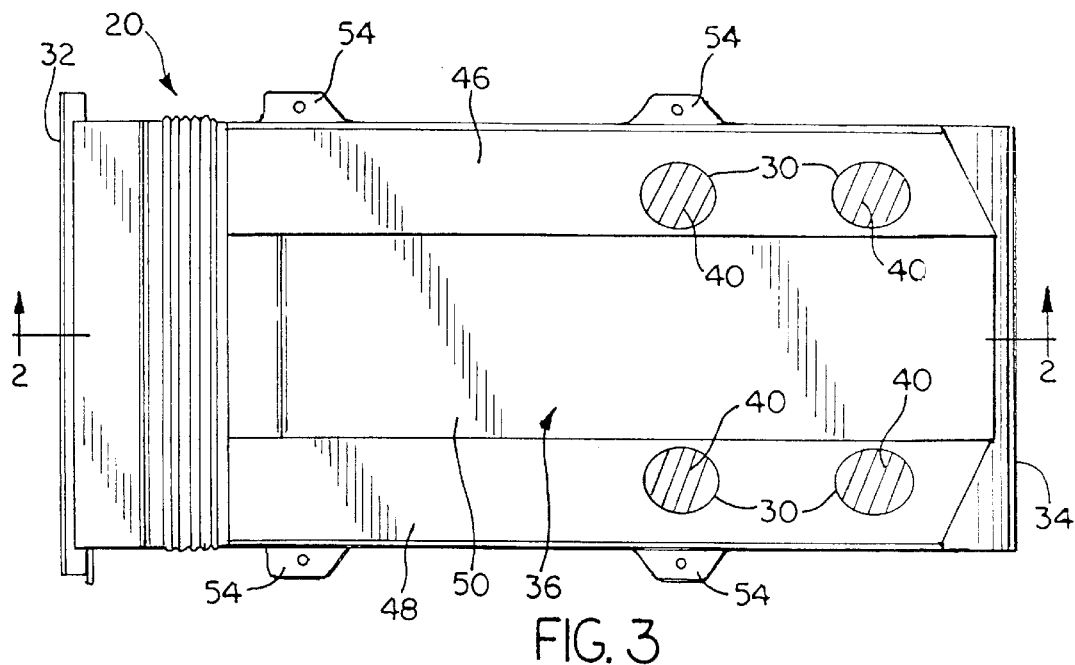
FIG. 3 is a bottom plan view of the driver vent duct.
Figure 4:
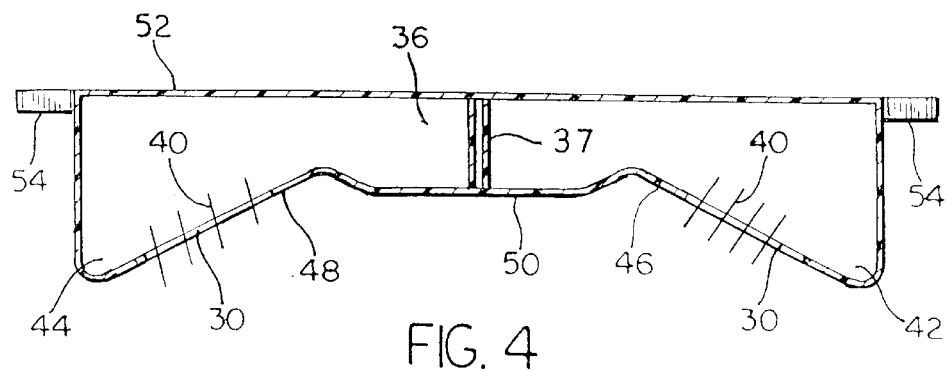
FIG. 4 is a sectional view of the driver vent duct taken along view lines 4—4 of FIG. 2.

A more detailed view of driver air duct 20 is shown in FIGS. 2–4. FIGS. 2 and 3 shown air duct 20 extending from an intake vent 32 to a terminus 34. Terminus 34 has a rounded shape to facilitate molding duct 20 out of a composite material, such as a hard plastic or polymer. As the front of the vehicle is typically disposed at an angle relative to the ceiling of the vehicle, intake vent 32 is disposed at an angle relative to a main passage portion 36 which is generally disposed in a parallel orientation relative to ceiling 22 (see FIG. 1). An intake passage 38 connects intake vent 32 to main passage 36 with a slight bend, and expands to meet main passage portion 36. Louvers 40, which may be adjustable, are disposed in air portals 30 to direct the outflowing air around driver seat 24.

FIG. 4 shows the contour of air duct 20, which at projections 42 and 44 is about twice as deep as the central portion of main passage 36 resulting in a region that is less constrictive to air flow than intake passage 38, thereby enhancing the air flow through duct 20 and out air portals 30. Projections 42 and 44 are partially defined by sloping walls 46 and 48, which extend toward the center of main passage portion 36 and merge with a flat center panel 50. A support 37 may be located in main passage 36 to provide structural stability to the duct. Air portals 30 are formed in sloping walls 46 and 48, and consequently the direction that louvers 40 direct the air is a function of their position within air portals 30 and the angular disposition of sloping walls 46 and 48. In the exemplary embodiment of the invention, sloping walls 46 and 48 are inclined at an angle of approximately 27° relative the planar surface of ceiling mounting panel 52. Ceiling mounting panel 52 also includes flanges 54 which serve as screw mounts for affixing duct 20 to ceiling 22. Also, an air filter 56 may be positioned within duct 20, as shown in FIG. 2 with air filter 56 disposed in intake passage 38. Alternatively, air filter 56 may be disposed in any suitable location between intake vent 32 and air portals 30.

Figure 5:
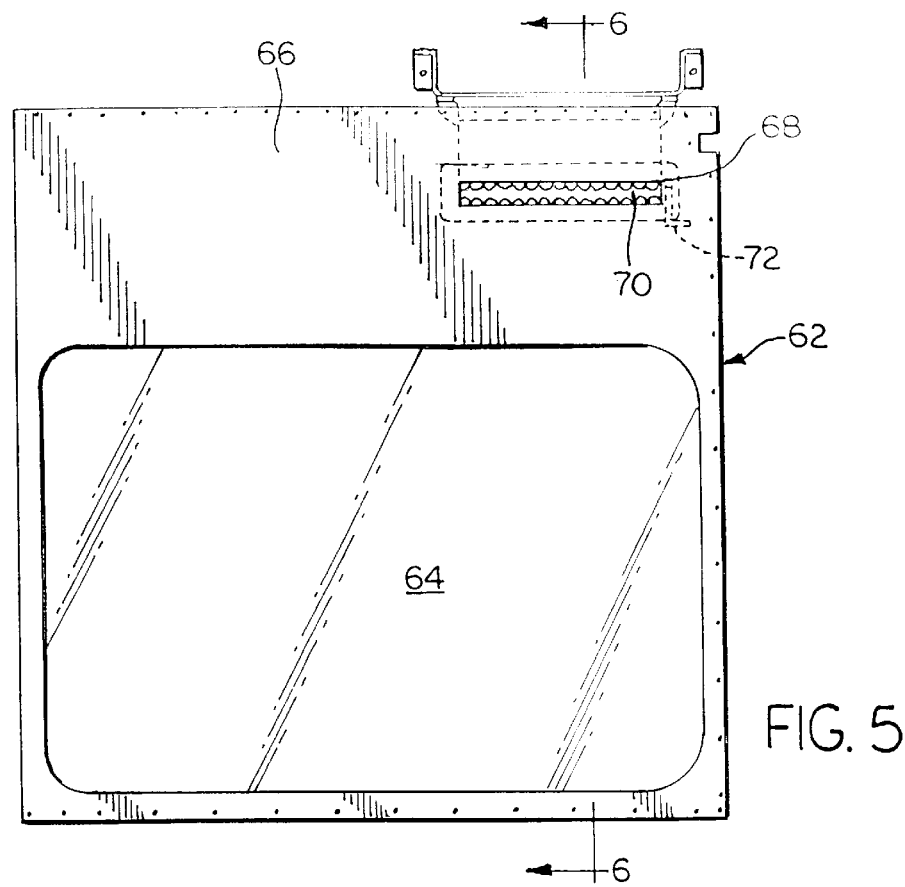
FIG. 5 is a front view of the upper front truck panel showing the intake vent apertures of the present invention.
Figure 6:
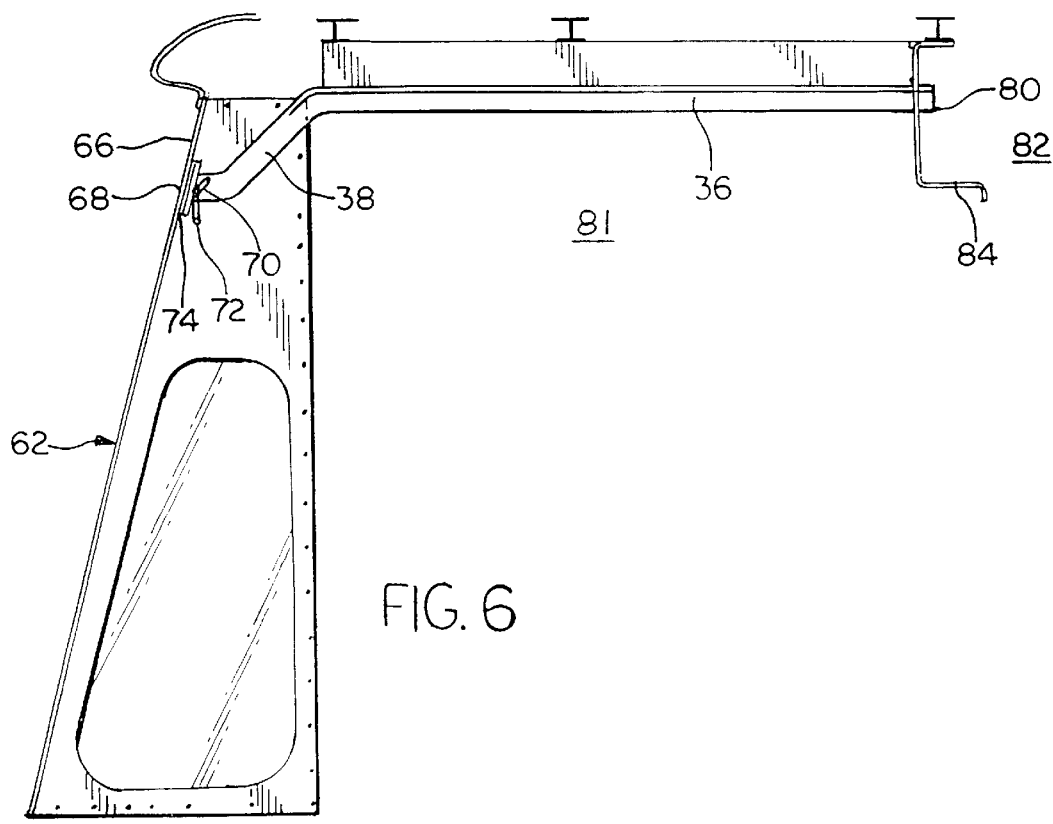
FIG. 6 is a section view of the cargo vent duct mounted in the driver section of a truck.
Figure 7:
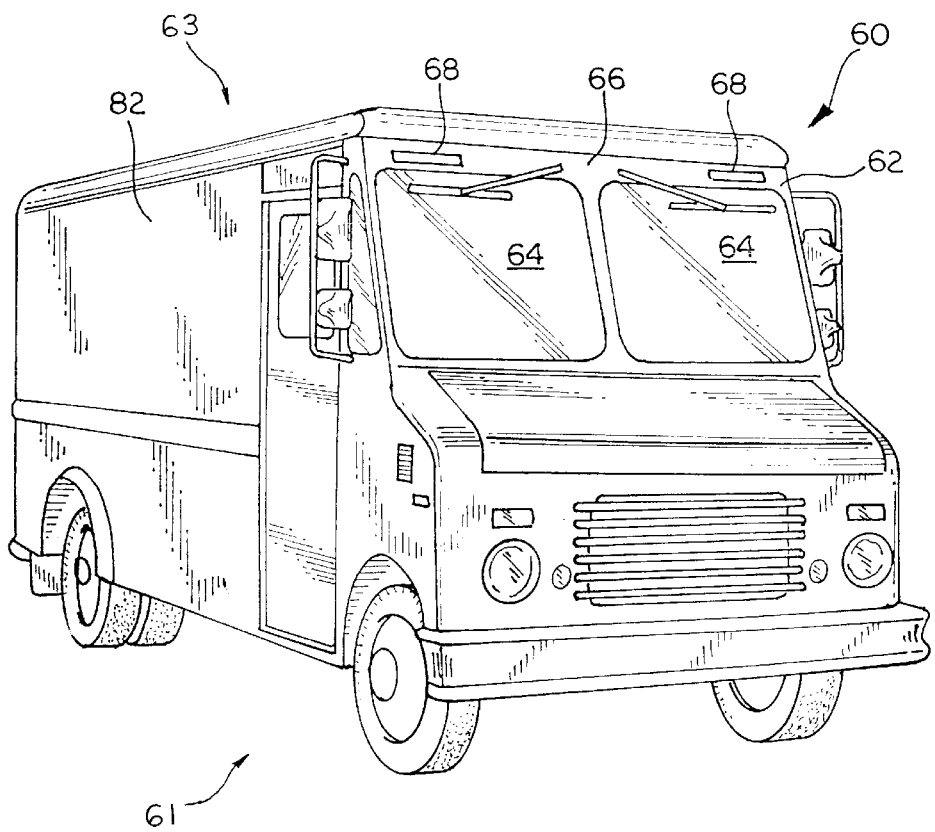
FIG. 7 is a perspective view of a truck with the driver vent duct of the present invention.

The connection of driver air duct 20 to the vehicle is shown in greater detail in FIGS. 5–7. Vehicle 60 (FIG. 7) includes a chassis generally indicated by 61 and a body generally indicated by 63. The vehicle body 63 has a front panel 62 disposed at a slight angle to the ground. Front panel 62 holds driver's windows 64 in position and includes an upper portion 66. Air openings 68 are formed in upper portion 66 and intake vent 32 is attached to upper portion 66 so that air may flow from the exterior of vehicle 60 through opening 68 into intake vent 32, and then into main passage portion 36. A damper 70 is disposed in intake passage 38 proximate air openings 68 to allow the driver to open or close the air flow through driver air duct 20 by use of a hand lever 72.

In FIG. 6, a cargo duct 80 is shown, which is attached in a similar manner as driver air duct 20 with the exceptions that cargo duct 80 is disposed on the passenger side of vehicle 60 and extends from a front section 81 of body 12 through a cargo wall 84 to a cargo or back section 82. Alternatively, cargo duct 80 may be omitted and a second duct similar to driver air duct 20 may be installed over a passenger seat to provide cooling air to the passenger seat.

In operation, forward motion of vehicle 60 creates an air flow through driver air duct 20 when damper 70 is open. Air enters duct 20 through air or vent opening 68 and into intake passage 38 through intake vent 32. The air then flows into main passage 36 flowing therefrom to the larger volume area of projection portions 42, 44 and out air portals 30 and sloped walls 46, 48 and projection portions 42, 44. The driver, sitting in driver seat 24, can adjust the direction of the air flow by varying the position of louvers 40, allowing for the air flow to be directed to the face of the driver regardless of the height or orientation of the driver. If the resulting air flow is uncomfortable, the driver may eliminate the air flow by closing damper 70 with hand lever 72. As the ambient air at the height of the top of vehicle 60 tends to be cooler, the resulting air flow provides cooling to the driver. Also, such ambient air tends to have less particular matter, i.e. dust and dirt, than air near the ground, particularly when vehicle 60 is in motion.

It should be appreciated that the configuration of intake passage 38 impedes moisture from entering air duct 20 also allows any moisture accumulating therein to drain from the duct. Any moisture entering main passage 36 will tend to accumulate in lower projections 42 and 44. As moisture accumulates in projections 42 and 44 it will tend to drain down into intake passage 38 which is downwardly sloping from main passage 36 and projections 42 and 44. Moisture draining down intake passage 38 will exit air duct 20 via intake vent 32 and out of truck 60 through air opening 68.

Driver air duct 20 may be fabricated by connecting together panels to form the disclosed design. Alternatively, driver air duct 20 may be made out of high density polyethylene by a molding process, for example with a 0.10 inch wall thickness, or other suitable composite or aluminum materials. Gasket 74 may be adhesively mounted to intake vent 32 to assist in preventing water leaks through air openings 68 when intake vent 32 is attached to upper portion 66.

In the preferred embodiment, as shown in FIG. 7, the air/vent openings 68 are formed to the sides of front panel 62, and it should be appreciated that said openings may be located elsewhere on said front panel, including the center.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A vehicle with a ventilation system comprising a chassis; a vehicle body mounted on said chassis, said vehicle body having a floor, a ceiling, a front section, and a back section, said front section further defining a vent opening for allowing air external to said vehicle to enter said body, and a duct mounted within said body on said ceiling, said duct including an intake portion extending upward from said vent opening, and said duct having at least one air portal structured and arranged to direct air into said body, said duct including a projection portion having an air passage which extends further from the ceiling than and along the length of a main passage portion creating an enlarged volume section to enhance airflow through the duct, said projection portion being in substantial open communication with said main passage portion along the length thereof.

2. The vehicle of claim 1 wherein said duct has an open first end located at the intake portion, said first end aligned with said vent opening, and a second closed end terminating within the vehicle body.

3. The vehicle of claim 2 wherein said second end is rounded.

4. The vehicle of claim 1 wherein said duct has a main passage portion at least partially defined by a mounting panel, said mounting panel generally parallel to said ceiling.

5. The vehicle of claim 1 wherein said air portal has louvers.

6. The vehicle of claim 1 wherein said air portal is formed in a sloped portion of said duct.

7. The vehicle of claim 1 wherein said duct includes an air filter.

8. The vehicle of claim 1 wherein said duct includes a damper.

9. The vehicle of claim 1 wherein said main passage portion and said projection portion form an area that is less constricting to airflow than said intake portion.

10. The vehicle as set forth in claim 9 wherein said projection portion is partially defined by a sloped wall of said duct and said air portal is located in said sloped wall.

11. The vehicle as set forth in claim 1 wherein said vent opening and said duct are located toward a side of the front section of the vehicle.

12. The vehicle as set forth in claim 1 wherein said duct extends to the back section and said air portal is located in the back section.

13. A ventilation duct for providing ventilation to a vehicle comprising a laterally extending main passage portion, an intake passage portion connected to said main passage portion, said intake portion terminating at an intake vent for the intake of air, a closed terminus portion at an end of said main passage portion that is opposite said intake portion, said terminus located within the vehicle body at an end of said duct opposite said intake portion, a projection portion connected to said main passage portion wherein said projection portion in combination with said main passage portion form an air passage, which is less constricting to air flow than said intake passage portion to enhance air flow through the duct, and an air portal for venting the air into the vehicle, the air flow through the duct being created by forward motion of the vehicle.

14. The ventilation duct as set forth in claim 13 wherein said projection portion extends in substantial open communication with said main passage portion.

15. The ventilation duct as set forth in claim 13, wherein said projection portion is partially defined by a downward slope.

16. The ventilation duct as set forth in claim 15 wherein said air portal is located in said downward slope.

17. The ventilation duct as set forth in claim 13 wherein said terminus portion is rounded.

18. A vehicle with a ventilation system comprising a chassis; a vehicle body mounted on said chassis, said vehicle body having a floor, a ceiling, a front section, and a back section; said front section further defining a vent opening for allowing air to enter the vehicle body; and a duct mounted on said ceiling of said body, said duct having an intake passage, a main passage portion and an area connected with said main passage portion forming a region of lessened constriction to air flow as compared to said intake passage to enhance air flow through the duct, said region of less constriction includes a projection being partially defined by a sloping wall, and said duct including at least one air portal located on said sloping wall for directing air into said body.

19. The vehicle as set forth in claim 18 wherein said intake passage is connected to and extends downwardly from said main passage portion, said intake passage terminating at an intake vent, said intake vent connected to said vent opening.

20. The vehicle as set forth in claim 18 wherein said duct and all air portals terminate within the vehicle body.

\* \* \* \* \*